United States Patent
Woodbridge et al.

(10) Patent No.: US 7,165,165 B2
(45) Date of Patent: Jan. 16, 2007

(54) ANTICIPATORY POWER CONTROL OF MEMORY

(75) Inventors: Nancy G. Woodbridge, Austin, TX (US); Vasu J. Bibikar, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 10/802,420

(22) Filed: Mar. 16, 2004

(65) Prior Publication Data

US 2005/0210206 A1   Sep. 22, 2005

(51) Int. Cl.
*G06F 9/32* (2006.01)
(52) U.S. Cl. .................. 711/219; 711/204
(58) Field of Classification Search ............. None
See application file for complete search history.

(56) References Cited

U.S. PATENT DOCUMENTS

| | | | | |
|---|---|---|---|---|
| 5,835,435 A | * | 11/1998 | Bogin et al. | 365/227 |
| 6,141,283 A | * | 10/2000 | Bogin et al. | 365/226 |
| 6,742,097 B1 | * | 5/2004 | Woo et al. | 711/170 |
| 7,028,200 B1 | * | 4/2006 | Ma | 713/324 |

* cited by examiner

*Primary Examiner*—T Nguyen
(74) *Attorney, Agent, or Firm*—John F. Travis

(57) ABSTRACT

In a system in which individual memory banks may be under individual power control, a subsequent need for a memory bank that is currently in a low power state may be anticipated, so that the memory bank may be powered up in advance of when it is needed, to reduce or eliminate delays caused by waiting for the memory bank to power up and become operational. The anticipation may be based on accessing a predetermined location in another memory bank.

19 Claims, 6 Drawing Sheets

ANTICIPATORY POWER CONTROL OF MEMORY

BACKGROUND

In a computer system with selective power control, individual memory banks that are not in current use may be placed in a reduced power state to save electrical power and extend battery life. Such implementations may wait until a need for a particular bank of memory arises before powering up that bank. Since transitioning from a reduced power state to a fully operational state takes a finite period of time, the system may have to wait for the needed bank of memory to be powered up and ready before accessing that bank of memory. This may force the processor or other accessing device to wait until the memory bank is ready, thus delaying the affected operations.

BRIEF DESCRIPTION OF THE DRAWINGS

The invention may be understood by referring to the following description and accompanying drawings that are used to illustrate embodiments of the invention. In the drawings.

DETAILED DESCRIPTION

Figure 1:
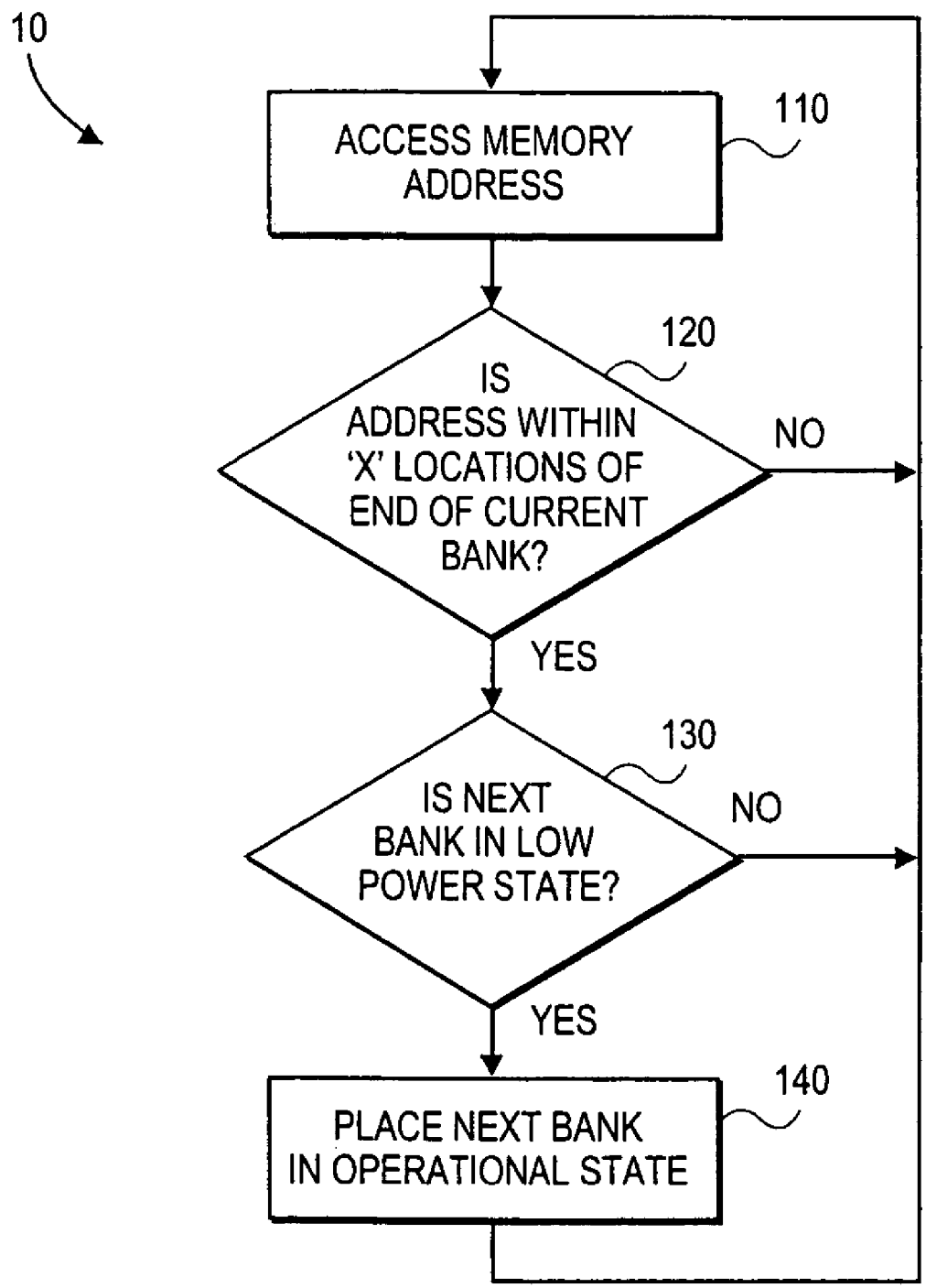
FIG. 1 shows a flow diagram of a method of anticipating access to a memory bank, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Some embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

Various embodiments of the invention may anticipate that a memory bank in a low power state is to be accessed, and power up the memory bank before such access is estimated to occur. The anticipation may be based on accessing another memory bank at a memory location that is within a predetermined range of the memory locations in the memory bank to be powered up. In some embodiments, including some of those described in more detail herein, a threshold address may be determined, and any access that is above the threshold address may be considered to be access within the predetermined range. Other embodiments, in which addresses are accessed in descending address order rather than ascending address order, may consider an access below the threshold address to be within the predetermined range. Although in some embodiments the addresses continue sequentially between the memory bank being accessed and the memory bank being power up, in other embodiments there may be a discontinuity in addresses between the two memory banks. The threshold address location may be at a particular place in a set of instructions, data, or both, that extends between the two memory banks. A memory bank may be considered to be a portion of memory that is able to be placed in a low power state or operational state independently from other portions of memory. An operational state may be a state in which instructions and/or data may be read from the memory bank and/or written into the memory bank. A low power state may be a state in which electrical power is consumed by the memory bank at a lesser rate than it is in the operational state. A low power state may be a state in which reading and writing operations to the memory bank cannot be reliably performed, but in which the contents of the memory bank are preserved, although various embodiments of the invention are not limited in this respect. Alternately, a low power state may be a state in which the contents of the memory bank are not preserved (e.g., a power-off state), and must be restored when transitioning the memory bank from the low power state to the operational state, although various embodiments of the invention are not limited in this respect.

FIG. 1 shows a flow diagram of a method of anticipating access to a memory bank, according to an embodiment of the invention. In the flow diagram 10, at 110 a memory bank may be accessed at the current address. The access may be a read or write operation, and the current address in the memory bank may contain an instruction or data. At 120, it may be determined if the address is within a predetermined number of locations from the end of the memory bank. If not, the flow may return to 110 for the next memory access. If it is within the predetermined number of locations from the end of the memory bank, it may be assumed that further operations will soon cause memory accesses to pass beyond the end of the current memory bank and into the next memory bank, and the next memory bank may be checked at 130 to see if it is in a low power state. If the next memory bank is in a low power state, as determined at 130, it may be placed into an operational state at 140. If the next memory bank is already in an operational state, as determined at 130, operation 140 may be skipped, although in some embodiments the circuitry to place the memory bank into an operational state may be triggered regardless of the current state, but will have no effect if the memory is already in the operational state.

The binary decision block at 130 simplifies decision-making by assuming there are only two states, operational and low power, but in reality the low power state may consist of multiple sub-states, each with a different combination of power saving techniques and recovery times. By the same token, there may be multiple operational states with different levels of operability. Such complexities are not discussed herein to avoid obscuring an understanding of the relevant embodiments. The accesses described herein may be any of multiple types, such as but not limited to: 1) read and/or write accesses by a processor, 2) read and/or write access by a non-processor device, 3) read and/or write accesses caused by a direct memory access (DMA) operation, 4) combinations thereof, 5) etc.

Figure 2:
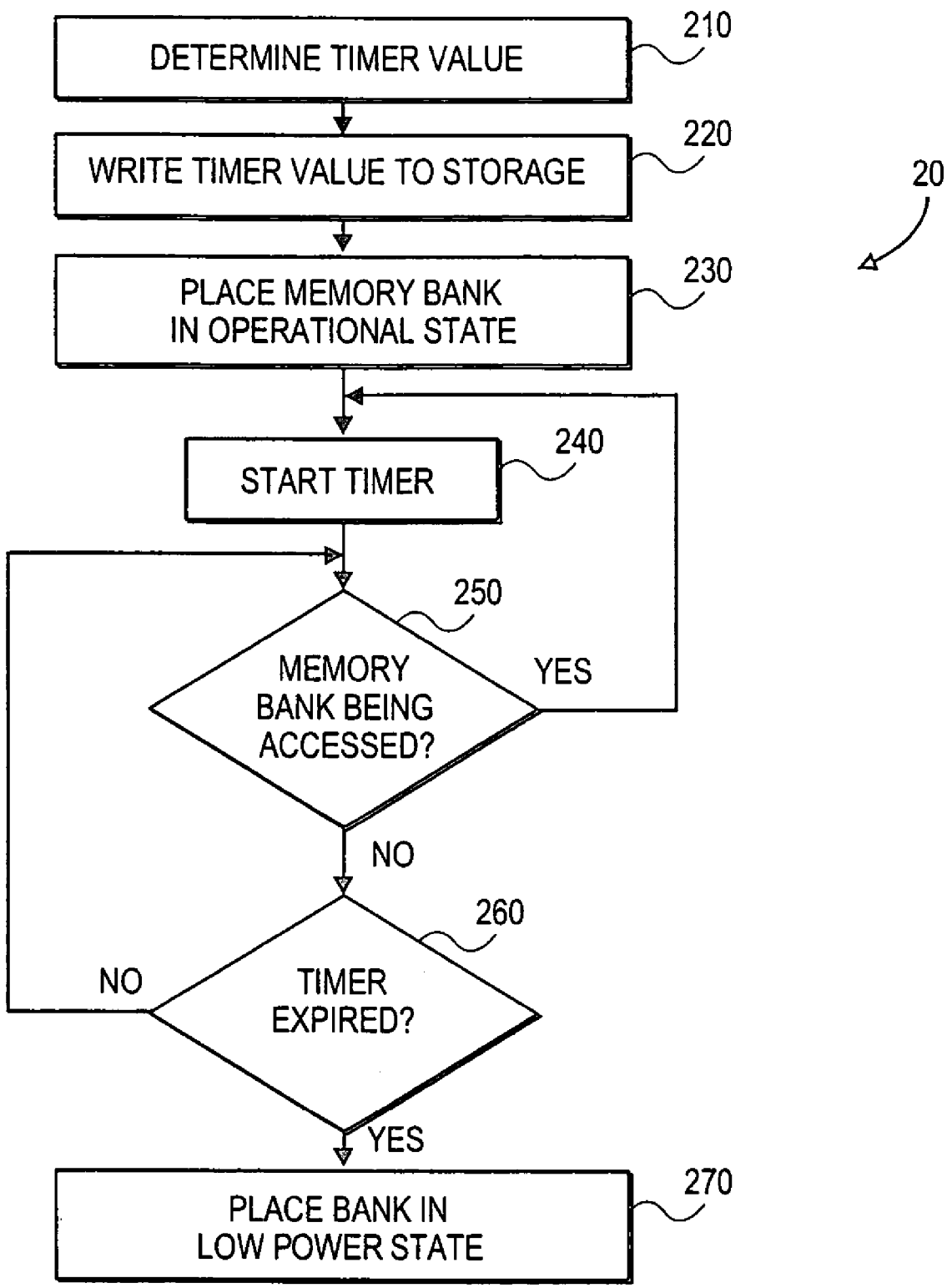
FIG. 2 shows a flow diagram of a method of placing a memory bank into a low power state after a period of non-use, according to an embodiment of the invention.

FIG. 2 shows a flow diagram of a method of placing a memory bank back into a low power state after a period of non-use in the operational state, according to an embodiment of the invention. In flow diagram 20, at 210 a timer value may be determined. This determination may be made during operation of the system, or may have been made at a previous time, such as during code development. At 220 the timer value may be written to a storage element coupled to the timer, thereby making the timer programmable, the timer value to be used as a starting value whenever the timer is started or restarted. At 230 the memory bank may be placed in an operational state through any feasible means, such as but not limited to the operation of block 140 in FIG. 1. The timer may then be started at 240. Each time the memory bank is accessed, as determined at 250, the timer may be restarted with its original starting value that was written at 220. As long as the memory bank is not accessed, the timer may continue to run until it expires at 260, at which time the memory bank may be placed into a low power state. The timer may be implemented in any feasible manner, such as hardware, software, a combination, etc., and may operate in a linear or non-linear (irregular) timing fashion. In some embodiments, there may be multiple low-power states, and the described process may be used to enter a particular one of those low power states, or may be used to enter different ones of those low power states depending on various factors not discussed here. In some embodiments the low power state may be entered without waiting for the timer to time out, for reasons external to the counter (e.g., the memory bank may be placed into a low power state by a power controller when another portion of the system is placed into a low power state).

Figure 3:
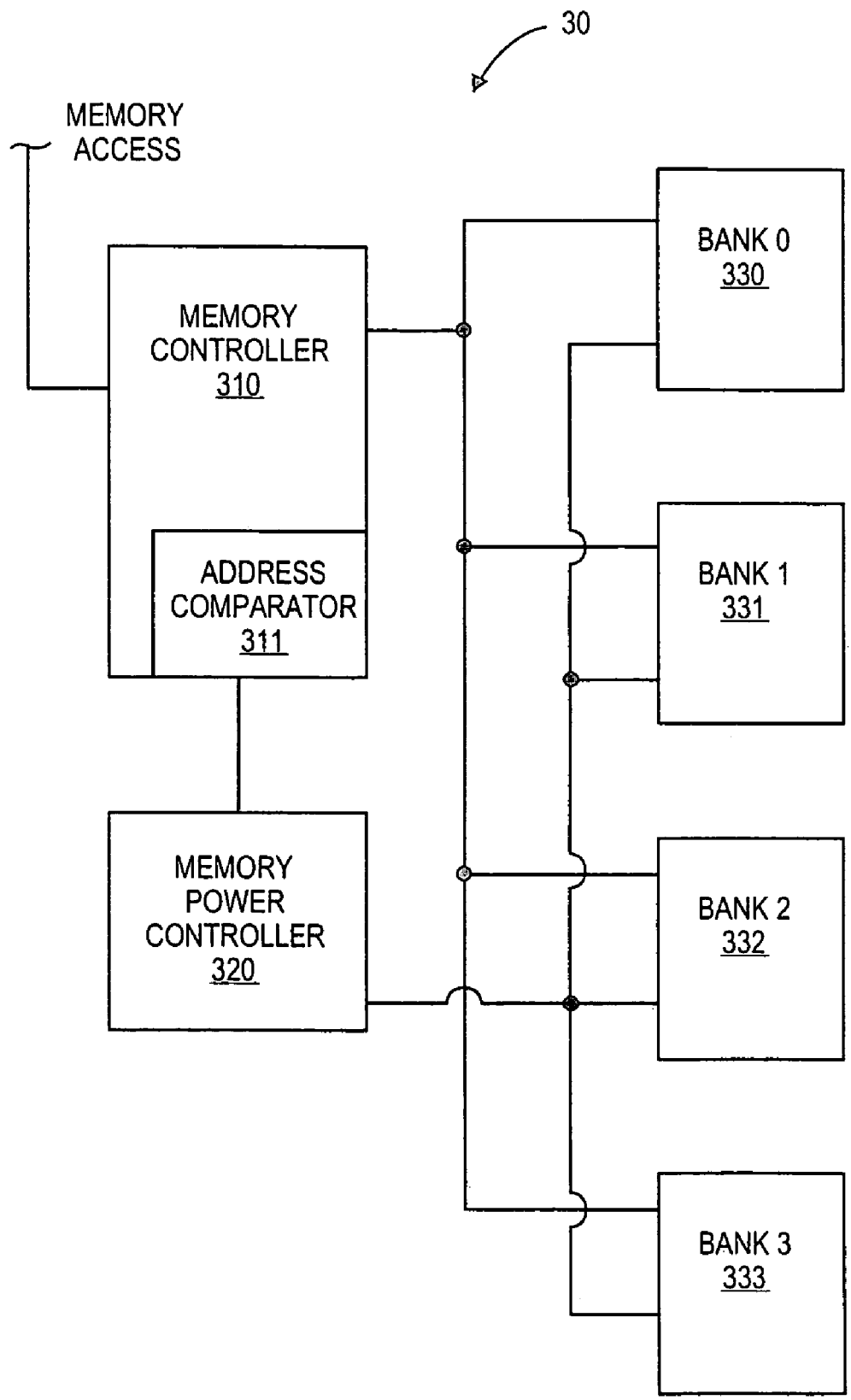
FIG. 3 shows a diagram of a circuit, or combination of circuits, to selectively control power to multiple memory banks, according to an embodiment of the invention.

FIG. 3 shows a diagram of a circuit, or combination of circuits, to selectively control power to multiple memory banks, according to an embodiment of the invention. In circuit(s) 30, memory banks 0–3, labeled 330–333 respectively, may be of any feasible type in which the individual memory banks have at least an operational state and a low power state, and that may be placed into those states independently of each other. The memory banks may be implemented with any of various technologies that have these characteristics, such as but not limited to static random access memory (SRAM), dynamic random access memory (DRAM), other volatile memory types, non-volatile memory types with operational and low power states, etc. In the illustrated example, it may be assumed that the addressable memory space extends linearly and contiguously from bank 0 through bank 3, although various embodiments of the invention may not be limited in this respect.

Requests for read and/or write memory access may be received by the memory controller 310 as indicated, and the memory controller 310 may control those accesses to all four memory banks. Such memory access requests may come from a processor, a non-processor device, an input-output (I/O) controller, a DMA controller, or any other feasible source. Memory power controller 320 may be used to individually control the power states for each memory bank. In the illustrated embodiment of FIG. 3, memory power controller 320 is shown coupled to an address comparator 311 that is within memory controller 310, and which provides inputs for memory power controller 320, but other embodiments may be configured differently.

Figure 4:
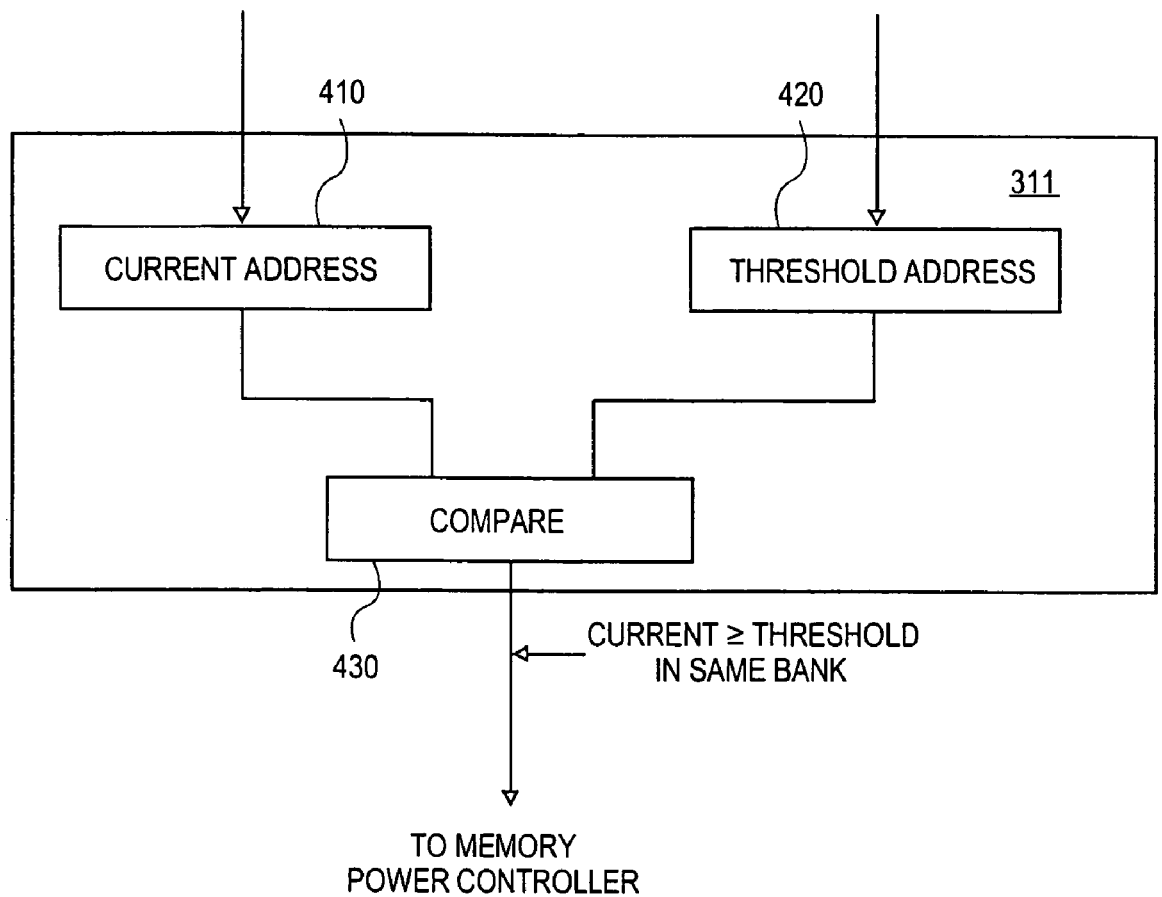
FIG. 4 shows a diagram of some of the inner details of an address comparator, according to an embodiment of the invention.

FIG. 4 shows a diagram of some of the inner details of an address comparator, according to an embodiment of the invention. In address comparator 311, a threshold address may be loaded into storage element 420, while the address that is currently being accessed may be placed at 410. Although 410 may be a storage element, it may also simply be a buffer to provide the current address to compare circuit 430, without providing intermediate storage for that address. If compare circuit 430 determines that the current address is greater than the threshold address (or alternately, determines that it is greater than or equal to the threshold address, depending on the specific implementation), then address comparator 311 may provide a signal to the memory power controller 320 indicating such, thereby triggering the sequence of events that cause the next memory bank to be placed in an operational mode.

Figure 5:
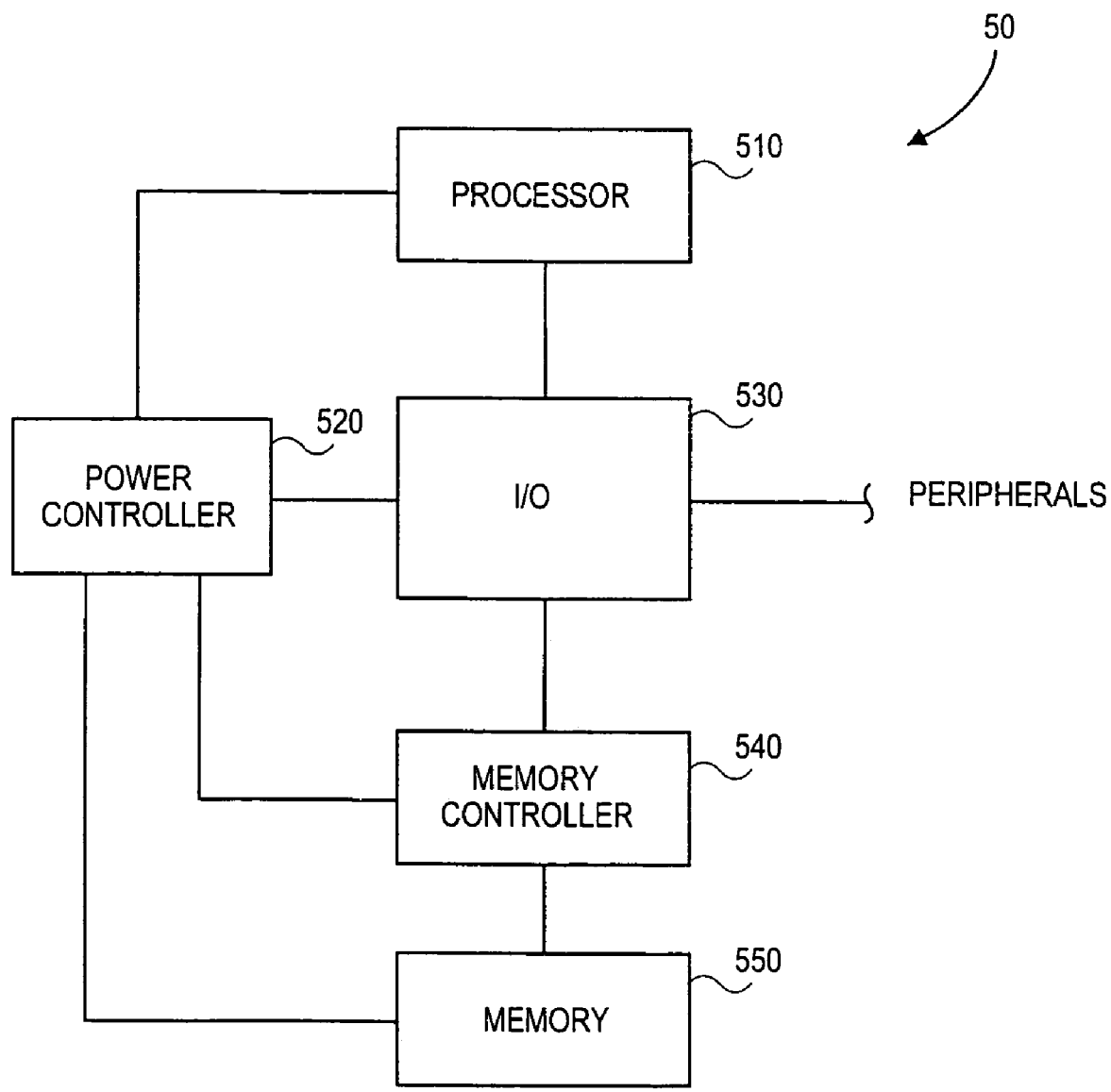
FIG. 5 shows a system comprising elements for anticipatory power control of memory banks, according to an embodiment of the invention.

FIG. 5 shows a system 50 comprising elements for anticipatory power control of memory banks, according to an embodiment of the invention. In some embodiments memory 550, memory controller 540, and power controller 520 may correspond to memory banks 330–333, memory controller 310, and memory power controller 320 of FIG. 3, respectively, but in other embodiments these elements may differ in various ways. Processor 510 may comprise a single processor or multiple processors. I/O circuitry 530 may provide an interface between processor 510, memory controller 540, power controller 520, and other system components such as peripherals. Memory requests may come to the memory controller 540 from processor 510, various ones of the peripherals, the I/O circuitry 530, and other components not specifically described. In some embodiments, power controller 520 may also provide power control for other elements in the system beside the memory banks.

Figure 6:
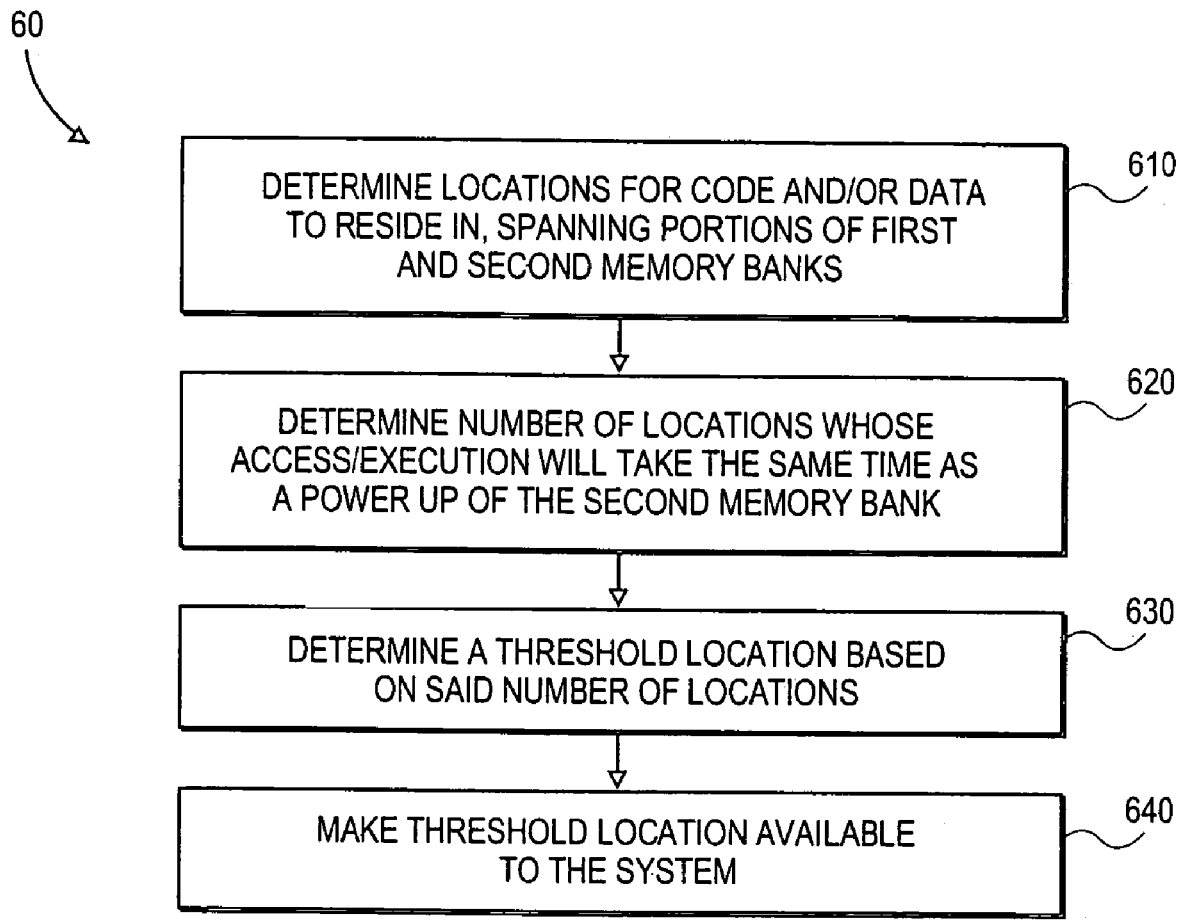
FIG. 6 shows a flow chart of a method of determining how to select the threshold address whose access may trigger the operation of powering up a memory bank, according to an embodiment of the invention.

FIG. 6 shows a flow chart of a method of determining how to select the threshold address whose access may trigger the operation of powering up a memory bank, according to an embodiment of the invention. The process of flow chart 60 might be followed, for example, after executable code has been produced, the memory address locations of the executable code have been determined or at least estimated, and it has been shown that related code will cause memory accesses to span the address space between two or more memory banks. At 610, it may be determined where within two memory banks the related code will be placed, and at what point in the code the transition from one memory bank to another will take place.

At 620 it may be determined how long it will take for a memory bank to power up from a low power state to an operational state, and an estimate of how many memory accesses it will take to occupy that amount of time. The number of memory accesses may then be converted into the number of memory locations whose access will take that amount of time. The clock speed of the memory may be a factor in this determination. If the access is expected to be linear, such as a DMA operation that accesses each location one time in sequence until after it crosses into the next memory bank, then the number of locations may be equal to the number of accesses. If the access is expected to be non-linear, such as accessing branch instructions that will skip over multiple locations, or accessing an iterative loop that will repeat multiple times before finally crossing over into the next memory bank, that complexity may be factored into a determination of how many separate locations will be accessed before crossing into the next memory bank. The desired number of locations may be set to approximate the previously determined power up time, may be set to a longer amount of time, or may be set to a shorter amount of time, depending on factors such as, but not limited to, the operational goals and the relative penalties for estimating too high or too low.

At 630, a threshold location (e.g., the lowest location whose access will trigger a power up of the next memory bank) may be determined based on the number of locations derived in the previous paragraph. Various techniques may be used. For example, the number of locations may be subtracted from the highest-numbered address in the current memory bank to produce the threshold location. At 640, the threshold value just determined may be made available for subsequent use by the system. This may be accomplished in any of various ways, such as but not limited to: 1) placing the value into a hardware storage element for use by the comparator circuit, 2) including the value in initialization code that, when executed, will place the value into the hardware storage element for use by the comparator circuit, 3) including the value in operational code that, when executed, will place the value into the hardware storage element for use by the comparator, 4) dynamically determining the value during operation and writing the value into the hardware storage element for use by the comparator circuit. Alternately, if a software counter and/or timer is to be used, any of these techniques may place the value into a software-accessible location for subsequent use by the software counter and/or timer.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
  a first memory bank;
  a second memory bank capable of having an operational state and a low power state;
  a memory controller coupled to the first and second memory banks and comprising a comparator to determine if a current address location in the first memory bank is within a predefined number of address locations from an address location in the second memory bank; and
  a memory power controller coupled to the second memory bank to change the second memory bank from the low power state to the operational state resultant to the comparator determining that the current address location is within the predefined number of address locations.

2. The apparatus of claim 1, wherein the low power state is a data-retaining state.

3. The apparatus of claim 1, wherein the second memory bank comprises volatile memory.

4. The apparatus of claim 3, wherein the volatile memory comprises static random access memory.

5. The apparatus of claim 1, further comprising a circuit to place the second memory bank in the low power state resultant to the second memory bank not being accessed within a predetermined interval.

6. The apparatus of claim 5, further comprising a programmable timer to indicate the predetermined interval.

7. A method, comprising:
  Determining if an address of an access to a first memory bank in an operational state is within a predetermined number of memory address locations to an address in a second memory bank in a low power state;
  placing the second memory bank in an operational state prior to a request for a subsequent access to the second memory bank; and
  performing said subsequent access to the second memory bank.

8. The method of claim 7, wherein said determining comprises accessing an address location in the first memory bank that is within a predefined number of address locations from an address location in the second memory bank.

9. The method of claim 8, wherein said accessing comprises a processor performing a request for a memory access in the first memory bank.

10. The method of claim 8, wherein said accessing comprises a direct memory access controller performing a request for a memory access in the first memory bank.

11. The method of claim 7, further comprising placing the second memory bank in a low power state resultant to the second memory bank not being accessed for a predefined interval.

12. A system, comprising:

a processor;

a first memory bank coupled to the processor;

a second memory bank coupled to the processor and capable of having a low power state and an operational state; and a circuit to place the second memory bank in the operational state from the low power state, responsive to the first memory bank being accessed at an address that is within a predetermined number of address locations from an address in the second memory bank.

13. The system of claim 12, wherein the circuit comprises a programmable storage element to store the address that is within the predetermined number of address locations from the address in the second memory bank.

14. The system of claim 12, wherein the first and second memory banks comprise volatile memory.

15. The system of claim 12, further comprising a programmable timer to be restarted responsive to the second memory bank being accessed.

16. The system of claim 15, wherein the circuit is to place the second memory bank into the low power state from the operational state, responsive to the timer timing out.

17. An article comprising a machine-readable medium that provides instructions, which when executed by a processing platform, cause said processing platform to perform operations comprising:

developing code for execution, the locations to contain the code to extend between first and second memory banks during said execution; and determining a threshold address for the first memory bank, the threshold address to be used to indicate that access to the first memory bank at an address above the threshold address during code execution is to indicate that access to the second memory bank is anticipated to occur within a predetermined interval.

18. The article of claim 17, wherein said determining is based on:

an estimated time for the second memory bank to transition from a low power state to an operational state; and an estimated time for said code execution to result in access to the second memory bank after accessing the threshold address.

19. The article of claim 17, further comprising placing instructions into the code that, when executed, will cause the second memory bank to go into an operational state.

* * * * *